May 26, 1942. E. D. McARTHUR 2,284,405
HIGH FREQUENCY APPARATUS
Filed Aug. 17, 1940 6 Sheets-Sheet 2

Inventor:
Elmer D. McArthur.
by Harry E. Dunham
His Attorney.

May 26, 1942.  E. D. McARTHUR  2,284,405
HIGH FREQUENCY APPARATUS
Filed Aug. 17, 1940  6 Sheets-Sheet 3

Inventor:
Elmer D. McArthur,
by Harry E. Dunham
His Attorney.

May 26, 1942.  E. D. McARTHUR  2,284,405
HIGH FREQUENCY APPARATUS
Filed Aug. 17, 1940   6 Sheets-Sheet 6

Inventor:
Elmer D. McArthur,
by Harry E. Dunham
His Attorney.

Patented May 26, 1942

2,284,405

UNITED STATES PATENT OFFICE 2,284,405

HIGH FREQUENCY APPARATUS

Elmer D. McArthur, Schenectady, N. Y., assignor to General Electric Company, a corporation of New York Application August 17, 1940, Serial No. 353,132

9 Claims. (Cl. 250—36)

The present invention relates to high frequency systems.

It is an object of the invention to provide an improved form of resonant structure useful at high frequencies as a tank circuit or energy-converting means. This object is accomplished by the use of a pair of juxtaposed disk-like members which provide a standing wave resonant system in which wave propagation occurs radially between the members. According to one aspect of the invention, the disk-like members are centrally joined by a conductive hub or bridge which is sufficiently short so that its inductive reactance is negligible in comparison with the lumped capacitive reactance of the members. With this arrangement, wave propagation is governed mainly by the distributed constants of the members and by the radial distance between the boundary of the bridging element and the common periphery of the members. A system thus constituted possesses special advantages in respect to the form of the standing wave patterns which it makes possible. As one consequence of this feature there are made available several novel and desirable ways of operating a number of high frequency vacuum tubes in parallel to assure their effective cooperation.

An important feature of the invention consists in the use of the central hub of a resonant system of the character specified as part of an arrangement for transferring high frequency energy to and from the system.

A further feature of the invention consists in the provision of means by which a structure of the type described may be used to effect push-pull operation of two electronic devices or of two groups of such devices.

Other features regarded as constituting important aspects of the invention comprise the provision of shielding means for preventing undesired radiation from the resonant system and of means for controlling and adjusting the operation of such a system.

A still further important feature consists in a novel form of electronic vacuum tube especially adapted for use with a resonant system of the type under consideration.

The features of the invention which I desire to protect herein are pointed out with particularity in the appended claims. The invention itself, together with further objects and advantages thereof, may best be understood by reference to the following description taken in connection with the drawings in which Fig. 6 represents the application of the invention in connection with an amplifier or the like; Fig. 3 shows a modification of the arrangement of Fig. 6 particularly with respect to the direct current connections thereof.

Figures 1, 2:
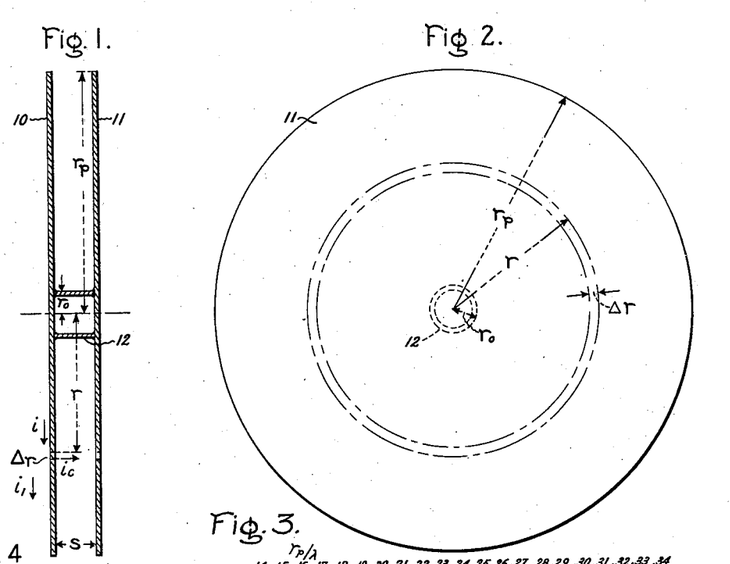
Figs. 1 and 2 are different views of an elementary structure helpful in explaining the invention.

Referring particularly to Figs. 1 and 2, there are shown sectional and side elevation views of an exemplary embodiment of the invention. Ignoring for the moment the mode of use of the apparatus shown, it may be described as consisting essentially of a pair of circular conducting disks 10 and 11 which are positioned in relatively close proximity to one another. Under proper conditions an arrangement such as that illustrated can be made to operate as a standing wave system, the simplest type of wave propagation being along radial lines extending from the line of centers of the disks 10 and 11 toward their peripheries. Such operation is governed mainly by the distributed constants of the disks and may be analyzed by a procedure given below. In this analysis it is assumed that the electrical resistance of the disks and the leakage current between them may be neglected. It is further assumed that the disks are sufficiently close to assure uniformity of the field between them and also that wave propagation occurs symmetrically with respect to the line of centers of the disks.

The potential difference between the disks at any distance $r$ from the center of the disks may be designated as $e$, where $e$ is variable with $r$ and also with time. The instantaneous current $i$ which flows to an incremental ring of inner radius $r$ and width $\Delta r$ may be represented by the equation $$i = i_1 + \Delta i \qquad (1)$$

where $i_1$ is the part of the current which leaves the outer edge of the ring in radial flow and $\Delta i$ is the capacitive current which flows transversely to the surface of the ring as a result of its capacitance to the opposed disk.

As a result of the current $i$ there will be an inductive drop across the ring $\Delta r$ due to radial current flow of $$\Delta e = L_r \frac{di}{dt} \qquad (2)$$

Also, the capacitive current may be written as $$\Delta i = i_c = C_r \frac{de}{dt} \qquad (3)$$

In these equations $L_r$ is the inductance of a ring $2\pi r$ in circumference and $\Delta r$ wide, and $C_r$ is the capacity between two such rings. In terms of the dimensions of the parts these quantities are $$\left. \begin{array}{l} L_r = 2 \times 10^{-9} \dfrac{s}{r} \Delta r \text{ henries} \\[6pt] C_r = 0.555 \times 10^{-12} \dfrac{r}{s} \Delta r \text{ farads} \end{array} \right\} \qquad (4)$$

where $s$ is the disk spacing.

Combining Equations 1, 2, 3, and 4 and assuming $\Delta r$ to approach zero as a limit, we have $$\left. \begin{array}{l} \dfrac{de}{dr} = \dfrac{a}{r} \dfrac{di}{dt} \\[6pt] \dfrac{di}{dr} = Br \dfrac{de}{dt} \end{array} \right\} \qquad (5)$$

where $$a = 2 \times 10^{-9} s$$

$$B = \frac{0.555}{s} \times 10^{-12}$$

Let $e$ be defined as the real part of the complex expression $E\epsilon^{jwt}$ and $i$ as the real part of $I\epsilon^{jwt}$ where $E$ and $I$ respectively represent maximum potential difference and current values and are complex functions of $r$ but not of $t$, and where $wt$ is the conventional expression for angular velocity in a system having an operating frequency $$f = \frac{w}{2\pi}$$

Previous writers have shown that this definition justifies treating $e$ and $E\epsilon^{jwt}$ (as well as $i$ and $I\epsilon^{jwt}$) as mathematical equalities for most analytical operations, in spite of the fact that the definition does not specify the identity of these quantities. Accordingly, we may write $$e = E\epsilon^{jwt} \qquad (6)$$
$$i = I\epsilon^{jwt}$$

Differentiating Equations 6 with respect to both $r$ and $t$ and substituting properly in 5, we have $$\frac{dE}{dr} = jw \frac{a}{r} I \qquad (7)$$

$$\frac{dI}{dr} = jwBrE \qquad (8)$$

Differentiate 7 with respect to $r$ and substitute 8 to give $$\frac{d^2E}{dr^2} + \frac{1}{r}\frac{dE}{dr} + w^2 aB E = 0 \qquad (9)$$

but $$w^2 aB = w^2 (2 \times 10^{-9} s)\left(\frac{0.555 \times 10^{-12}}{s}\right)$$
$$= 1.11 \times 10^{-21} w^2 = \frac{w^2}{c^2} \qquad (10)$$

where $c$ is the velocity of light. If we represent $$\frac{w^2}{c^2}$$

by $\mu^2$, Equation 9 becomes $$\frac{d^2E}{dr^2} + \frac{1}{r}\frac{dE}{dr} + \mu^2 E = 0 \qquad (11)$$

This is the zero order Bessel equation for which the solution is $$E = AJ_0(\mu r) + BN_0(\mu r) \qquad (12)$$

where $J_0$ is a Bessel function of the first kind and of zero order; $N_0$ is a Bessel function of the second kind (sometimes called a Neumann function) and of zero order; $A$ and $B$ are integration factors.

The current $I$ may be calculated in a generally similar manner and we find that $$I = j\frac{r s}{60 s}[AJ_1(\mu r) + BN_1(\mu r)] \qquad (13)$$

where $J_1$ and $N_1$ are respectively Bessel and Neumann functions of the first order.

The integration factors $A$ and $B$ in Equations 12 and 13 may be evaluated by a consideration of boundary conditions. For example, by regarding the voltage $E_p$ and the current $I_p$ which exist at the disk periphery $r_p$ as known or ascertainable quantities, Equations 12 and 13 may be rewritten in terms of the ratio $$\left(\frac{E_p}{I_p} = Z_p\right)$$

of these quantities as follows:

$$E_0 = E_p\left[\left(a_1 + j\frac{a_2}{Z_p}\right)J_0(\mu r) + \left(b_1 + j\frac{b_2}{Z_p}\right)N_0(\mu r)\right] \qquad (14)$$

$$I = \frac{r}{60 s} E_p\left[\left(\frac{-a_2}{Z_p} + j a_1\right)J_1(\mu r) + \left(\frac{-b_2}{Z_p} + j b_1\right)N_1(\mu r)\right] \qquad (15)$$

where $a_1$, $a_2$, $b_1$ and $b_2$ are now known constants determined solely by the dimensions and assumed operating wave length of the system.

In one use which is contemplated for the device of Fig. 1 it is intended that the device shall function as a resonant circuit for a high frequency device connected between the disks 10 and 11 at their peripheries. It is desirable, therefore, to examine the conditions under which such operation can occur.

It may be taken as a reasonable supposition that resonant effects can be produced in one way by providing a low impedance connection between the disks at some region displaced from the periphery of the disk in order to obtain standing-waves in a manner analogous to the operation of a quarter wave linear transmission line which is shorted at one end. In order to check this possibility, let it be assumed that a shorting connection is in fact provided in the form of a circular hub 12 (Fig. 1) which is symmetrical with respect to the line of centers of the disks 10 and 11 and which has a radius $r_0$. It is proposed to consider whether there is any value of the quantity $r_0$ which will assure the desired resonant action.

In this connection, it may be noted first that as a matter of definition resonance assumes maximum or infinite impedance (i. e., voltage finite and current zero) to exist at some place in the system. In the present case, the region of infinite impedance is arbitrarily specified as the gap between the peripheries of the disks 10 and 11. Consistent with this definition, we may, therefore, write from Equation 13

$$I_p = j\frac{r_p}{60_e}[AJ_1(\mu r_p) + BN_1(\mu r_p)] = 0 \qquad (16)$$

whence $$\frac{A}{B} = -\frac{N_1(\mu r_p)}{J_1(\mu r_p)} \qquad (17)$$

Furthermore, at the hub 12 (i. e. at $r=r_0$) the current will be finite and the voltage zero (assuming zero impedance of the hub) so that Equation 12 may be written $$E = AJ_0(\mu r_0) + BN_0(\mu r_0) = 0 \qquad (18)$$

whence $$\frac{A}{B} = -\frac{N_0(\mu r_0)}{J_0(\mu r_0)} \qquad (19)$$

To be consistent with our initial postulates, Equations 17 and 19 must be true simultaneously, hence we may write $$\frac{N_1(\mu r_p)}{J_1(\mu r_p)} = \frac{N_0(\mu r_0)}{J_0(\mu r_0)} \qquad (20)$$

where $$\mu = \frac{w}{c} = \frac{2\pi}{\eta}$$

Figures 3, 4, 5:
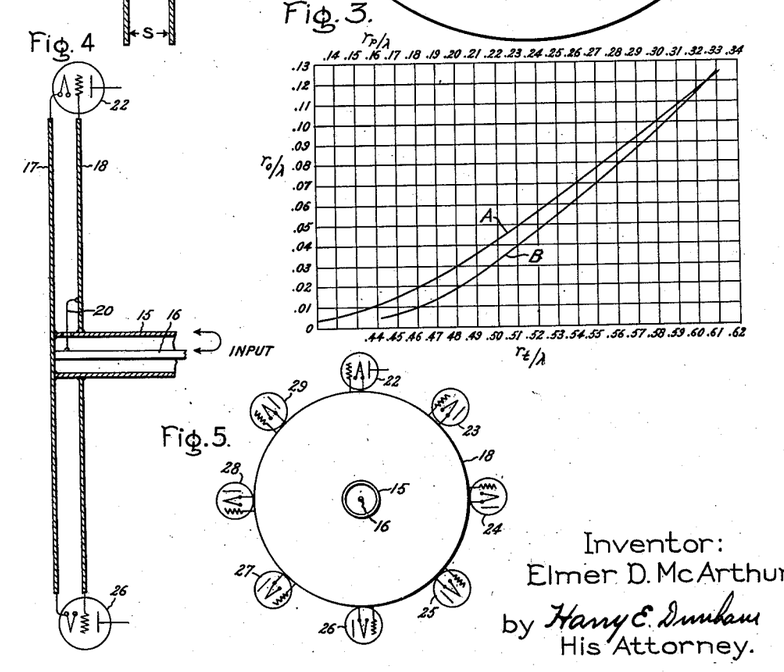
Fig. 3 is a graph representing certain data useful in applying the invention.
Fig. 4 illustrates one mode of application of the invention.
Fig. 5 is a side elevation on a reduced scale of the structure of Fig. 4.

This equation may be solved for $r_0$ with any assumed value of $r_p$ by graphical means. Certain values of $$\frac{r_p}{\eta}$$

and $$\frac{r_0}{\eta}$$

for which Equation 20 holds are plotted in curve A of Fig. 3. From this curve it is readily possible for any value of the wavelength $\lambda$ and for any arbitrarily chosen value of either $r_0$ or $r_p$ to determine the value of the other radius required for resonance. It will be understood that in the use of the curve A, values of $$\frac{r_0}{\lambda}$$

are to be read on the vertical scale and values of $$\frac{r_p}{\lambda}$$

on the upper horizontal scale. The curve B and the lower horizontal scale pertain to a somewhat different structural arrangement and will be referred to more fully at a later point.

In order to obtain resonant operation in accordance with the considerations discussed above, it is important that the hub 12 be sufficiently short so that its lumped inductive effect is negligible in comparison with the lumped capacitive effect of the disks 10 and 11 at the resonant frequency. (This may be assumed to be the case as long as the hub inductive reactance is on the order of or less than 10 per cent of the disk capacitive reactance.) Where this condition is not complied with, the device tends to become unstable as a result of the tendency of the hub to resonate with the lumped capacitance of the disks. This latter mode of operation is incompatible with that which has been described above and which distinguishes my present invention.

A resonant system such as that described in the foregoing is particularly useful in that it provides means for symmetrically coupling a number of high frequency devices (e. g. vacuum tubes) to an exciting source or transmitting agency which is itself structurally unsuited for such coupling. An exemplary arrangement illustrating this point is shown in Figs. 4 and 5.

In this case the invention is shown as being applied for the purpose of permitting the input of a number of triode vacuum tubes to be excited from a single exciting source. It is assumed that the source is appropriately coupled to the conductors 15 and 16 of a coaxial transmission line as is indicated by the legend at the left hand side of Fig. 4. A pair of circular disks 17 and 18 are mounted coaxially on the tubular conductor 15 at one end thereof so that the extremity of the conductor forms a hub connecting the disks. An inductive loop 20 which is connected between the conductor 16 and the disk 18 and which extends into the free space between the disks serves as a means for exciting the disk system in accordance with signals propagated along the transmission line.

It is assumed that the radius of the conductor 15 and the radial dimensions of the disks 17 and 18 are such that their combination constitutes a resonant system of the type described above in connection with Fig. 1. Under these circumstances disturbances created by the inductive loop 20 will cause radially moving waves to be propagated within the space between the disks in such fashion as to produce a voltage antinode at the periphery of the disks. In accordance with the theory previously given, the voltage will be uniform around the periphery of the disks; consequently, it is possible to connect a large number of vacuum tubes to the disks in such fashion as to cause their parallel excitation. One possible arrangement of tubes is shown in Fig. 5, in which there are illustrated eight tubes, numbered 22 to 29 inclusive, distributed at uniform intervals around the periphery of the disks. The sectional view of Fig. 4 shows the manner in which the disks are respectively connected with the cathodes and grids of two of the tubes (22 and 26). The direct current connections and the anode circuits of the tubes are not shown, but may be of the character indicated in Fig. 6 for example.

Figure 6:
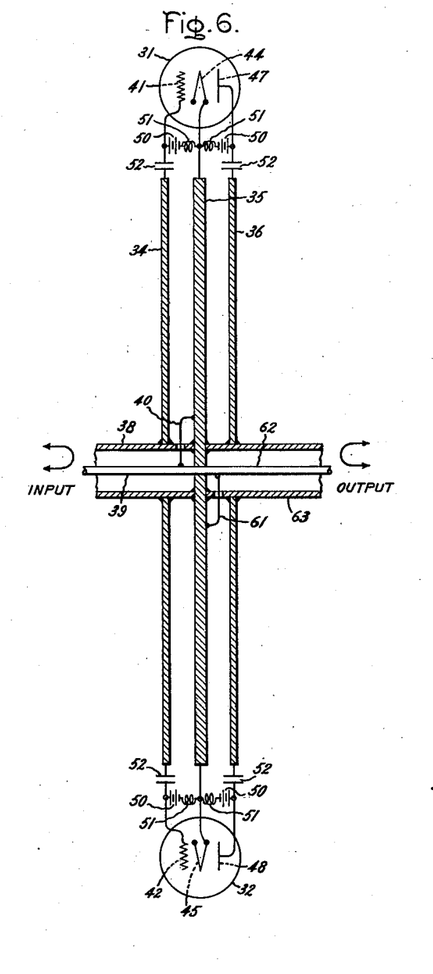

A somewhat more complete system is illustrated in Fig. 6 which shows an arrangement of two juxtaposed disk resonators adapted to serve respectively as resonant input and output circuits for a plurality of parallel operated high frequency tubes. In the figure referred to only two tubes (31 and 32) are shown, these being connected at diametrically opposite points of the disk system.

In this case the high frequency system includes a series of three disks numbered 34 to 36 inclusive. The disks 34 and 35 are adapted to serve as an input circuit fed from a concentric transmission line having conductors 38 and 39. Energy exchange between the transmission line and the disk resonator is accomplished by means of an inductive loop 40. The periphery of the disk 34 is connected to grids 41 and 42 which are respectively associated with the tubes 31 and 32.

In similar fashion the periphery of the disk 35 is connected to cathodes 44 and 45. The output circuit for the tubes is formed by the combination of the disks 35 and 36, and to this end the disk 36 is peripherally connected to the tube anodes 47 and 48. Appropriate D.-C. voltages are impressed between the various electrodes by means of batteries 50 which are connected through appropriately arranged choke coils 51. Condensers 53 serve to isolate the disks 34, 35 and 36 from the D.-C. system.

In the operation of the arrangement described, signal disturbances produced in the space between the disks 34 and 36 by means of the inductive loop 40 are propagated symmetrically outward to produce standing waves having a voltage loop at the periphery of the disks. The voltage developed at this point is impressed between the grids and cathodes of the various tubes as has been previously explained.

The amplified signals thus produced in the outputs of the tubes are fed in parallel to the resonant system provided by the disks 35 and 36 so as to cause standing wave phenomena in the region between these disks. Energy is abstracted from this standing wave system by means of an inductive loop 61 connected to the inner conductor 62 of a coaxial transmission line of which the outer conductor 63 forms a connecting hub between the disks 35 and 36. It is assumed that the transmission line 62—63 is connected to an appropriate utilization device such, for example, as a transmitting antenna. (This connection is indicated by the legend appearing at the right hand side of Fig. 6.)

In order to facilitate the separate functioning of the input and output systems of Fig. 6 the disk 35 is made of relatively great thickness, preferably several times the depth of current penetration at the operating frequency. With this precaution the tendency of the high frequency waves to travel only over the surfaces of the disk prevents coupling, or feedback, between the output and input systems.

Figure 7:
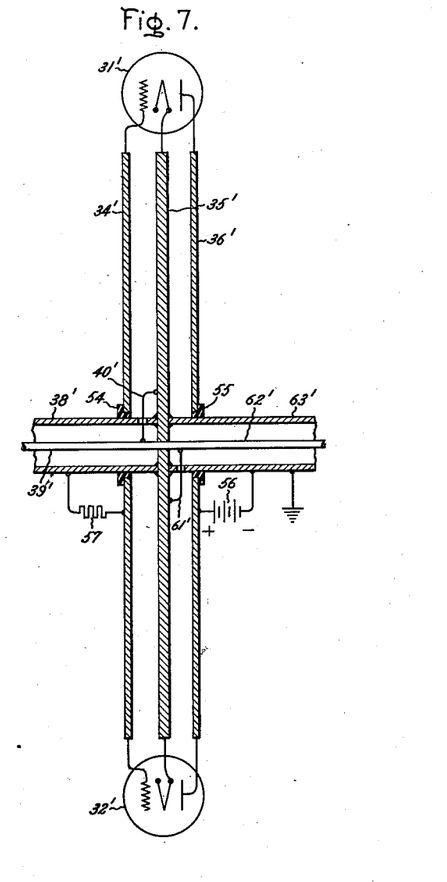

Fig. 7 represents a modification of the structure of Fig. 6 which embodies a somewhat more practical arrangement of the direct current circuits. Since many of the elements shown are identical in function with those of Fig. 6, they have been similarly identified except for the expedient of priming the index numerals.

In this case the outer disks 34' and 36' are insulated from the hub parts 38' and 63' by insulating inserts 54 and 55. The use of these inserts makes it possible to energize in parallel the plate circuits of the tubes 31' and 32', as well as of all other tubes connected with the disk system, simply by connecting a voltage source 56 between the disk 36' and a part which is conductively connected with the disk 35'. In similar fashion, all the grids of the various tubes may be biased in common by the use of a single biasing resistor connected as indicated at 57. On the other hand, the presence of the insulating inserts 54 and 55 is of no significance as far as the high frequency aspects of the system are concerned because of the effective shunting of these inserts by the capacitance existing between the edges of the disks 34' and 36' and the hub parts 38' and 62'. Obviously, the arrangement thus provided has a considerable advantage in simplicity over the system of Fig. 6.

Throughout the foregong discussion the assumption has been made that the mode of energization of the resonant structure is such as to produce wave propagation which is symmetrical with respect to the axis of the structure. This is by no means a fundamental limitation of the system under consideration, inasmuch as numerous unsymmetrical modes of operation are possible. For example, in Fig. 8 an arrangement is shown for causing a second kind of operation which is useful in producing push-pull excitation of two or more appropriately arranged tubes.

Figures 8, 9, 10:
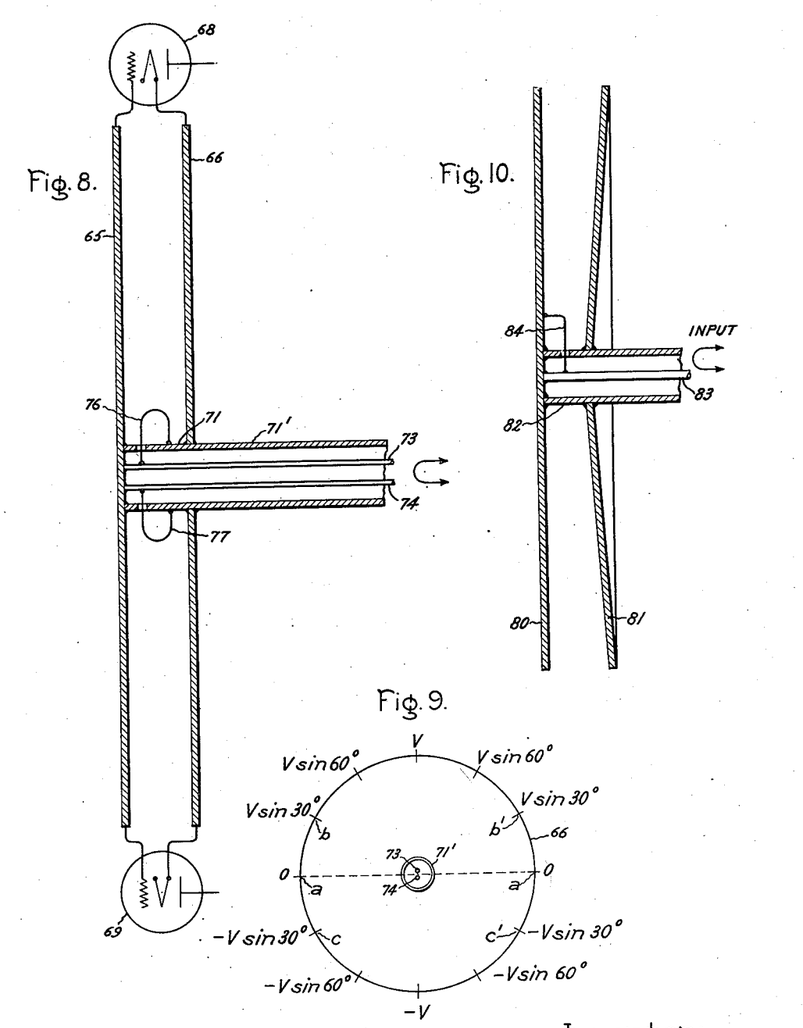
Fig. 8 shows the use of the invention in connection with a push-pull arrangement of discharge devices.
Fig. 9 is a side elevation of the structure of Fig. 8.
Fig. 10 illustrates a further structural modification of the invention.

In this case the disk elements, which are numbered 65 and 66 respectively, are connected to the cathodes and grids of a pair of high frequency triodes 68 and 69. (The output and D.-C. circuits of these tubes are not shown but may be of the character indicated in Fig. 6.) The disks are supported on a tubular conductive hub 71 which is of such dimensions with respect to the radius of the disks themselves as to permit resonant effects to occur at a particular operating frequency. Exciting voltage of this frequency is transmitted to the disk system by a pair of parallel conductors 73 and 74 which are arranged within a tubular shield 71' constituting an extension of the hub 71. These conductors are excited from an input source in such fashion that their voltage variations are of opposite phase with respect to some arbitrarily chosen neutral. The conductors 73 and 74 are respectively coupled to the space between the disks 65 and 66 by means of a pair of oppositely disposed inductive loops 76 and 77. As a result of the phase difference between the exciting impulses supplied to the loops 76 and 77, the voltage distribution observable at various points around the circumference of the disks will be as indicated in Fig. 9. That is to say, there will be a sinusoidal variation (i. e. from a maximum value of V to a minimum value of zero) which is symmetrical with respect to a neutral plane $a$—$a$ perpendicular to the plane of the exciting loops 76 and 77. Tubes connected between the disks above the neutral plane $a$—$a$ will be excited in push-pull relationship to tubes connected below such plane. In general the region of effective connection will be limited to the points which lie respectively between the points $b$ and $b'$ and the points $c$ and $c'$. In the regions $b$—$c$ and $b'$—$c'$, the observable voltage variations will be relatively slight (i. e. less than $V \sin 30°$).

From the standpoint of structure it will be understood that perfect parallelism of the disks which constitute the resonant system is not essential, and in Fig. 10 I have shown an operative arrangement in which such parallelism does not exist. In this case the system illustrated comprises a circular planar disk 80 and a disk 81 which is of slightly conical or frustro-conical character. It is assumed that the system is to be used in the same manner as the arrangements previously described and to this end the hub 82 which connects the disks 80 and 81 is represented as the outer conductor of a transmission line having an inner conductor 83 coaxially arranged therein. An inductive loop 84 couples the transmission line to the free space between the disks.

While the theory of operation and design of the system will be somewhat modified by the non-planar character of the disk 81, resonant operation may nevertheless be obtained provided certain fundamental requirements are not violated. Specifically, the length of the hub 82 between the disks should be sufficiently short so that its inductance may be deemed negligible, and the spacing of the disks should be sufficiently close at all points to assure a reasonably uniform electric field.

For many uses of the invention it is desired that the resonant system be made of non-dissipating character. This may be accomplished in an advantageous manner by the arrangement of Fig. 11 which shows a series of three disks 86, 87 and 88 employed in a fashion generally similar to the arrangement of Fig. 7. This arrangement utilizes the disks 86 and 87 as an input system which is supplied with an exciting signal through a coaxial transmission line having parts 90 and 91. It further employs the disks 87 and 88 as an output system which is coupled to a second transmission line having parts 94 and 95. The input system is connected to the grid circuits of a plurality of amplifier tubes (of which two tubes, numbered 97 and 98, are shown), and the output system is connected to the anode circuits of the same tubes. The point of connection of the tubes 97 and 98 corresponds to a voltage antinode and is determined in accordance with the theory given above.

By a further application of the same theory, it is found the existence of a voltage antinode at the region of tube connection is not inconsistent with the existence of a voltage node at a particular location outside said region. In terms of structure, this means, therefore, that the disks may be peripherally bridged or shorted without making resonant operation impossible, provided the radius at which shorting occurs is properly correlated to the radius of the central hub and also to the radius at which a voltage antinode is desired. Analysis shows that the proper correlation exists when the following relationship is established:

$$\frac{J_0\left(2\pi\frac{r_0}{\lambda}\right)}{N_0\left(2\pi\frac{r_0}{\lambda}\right)} = \frac{J_1\left(2\pi\frac{r_p}{\lambda}\right)}{N_1\left(2\pi\frac{r_p}{\lambda}\right)} = \frac{J_0\left(2\pi\frac{r_t}{\lambda}\right)}{N_0\left(2\pi\frac{r_t}{\lambda}\right)}$$

where $r_0$ is the radius of the hub, $r_p$ indicates the radial position of the tubes, $r_t$ is the radius of the disks to the point of their short-circuiting and J and N respectively designate Bessel functions of the first and second kind. With a given value of $\lambda$ and with an arbitrarily chosen value of any of the radial quantities referred to, the above equation can be solved for the other two radii by the use of curves A and B of Fig. 3. For example, taking a preferred value of $$\frac{r_p}{\lambda}$$

as a starting point, the corresponding value of $$\frac{r_0}{\lambda}$$

may be obtained by the use of curve A. Thereafter, with $$\frac{r_0}{\lambda}$$

now considered as known, the corresponding value of $$\frac{r_t}{\lambda}$$

may be read from curve B in connection with the lower horizontal scale of coordinates.

Figure 11:
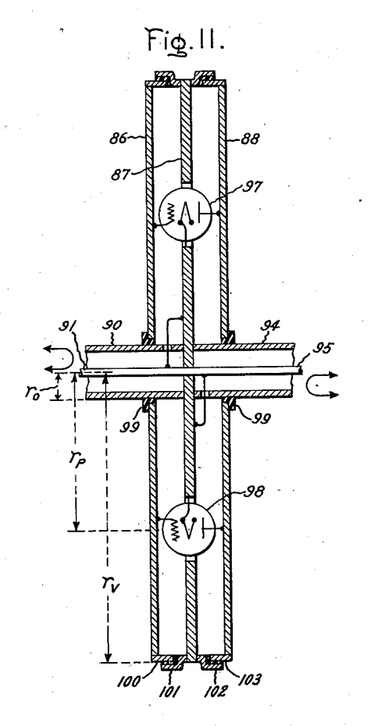
Fig. 11 illustrates the application of the invention in connection with an arrangement which is shielded against undesired radiations of wave energy.

The shorting of the disks may be accomplished in one way by the provision of overlapping flanges 100 and 101 associated with one pair of disks and flanges 102 and 103 associated with the other pair. These flanges are insulatingly separated to prevent short-circuiting of the direct current components of the system. However, because of their mutual capacitance, they are quite as effective as a direct conductive connection between the disks from the standpoint of high frequency currents. The utility in the present connection consists in the fact that they completely shield the region of wave propagation so as to prevent any external radiation of wave energy without thereby affecting in any objectionable way the resonance characteristics of the disk system.

Insulating inserts 99 interposed between the outer disks 86 and 88 and the tubular conductors 90 and 94 permit direct current connections (not shown) to be made to the tubes 97 and 98 in the same manner as in Fig. 7.

Figure 12:
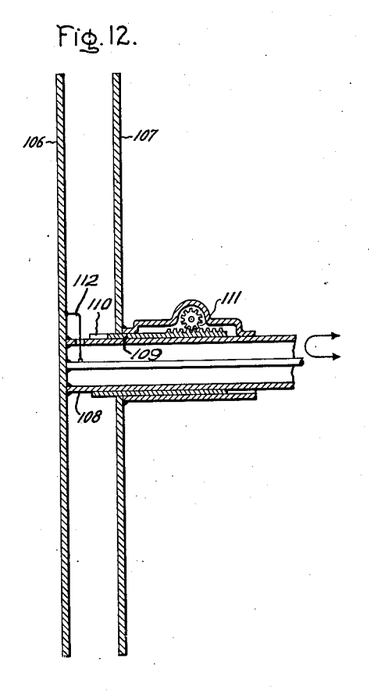
Fig. 12 represents an arrangement for adjustably tuning a resonator embodying the invention.

While such systems as those discussed in the foregoing may be designed with a high degree of accuracy, it is desirable to provide at least a small degree of adjustability for purposes of precise tuning. This may be done conveniently by an arrangement such as that which is shown in Fig. 12, it being understood, of course, that the special features of this figure may be incorporated in or combined with any of the constructions herein described.

In the figure just referred to a resonant system is provided by the combination of two parallel disks 106 and 107 which are supported coaxially upon the outer conductor 108 of a transmission line adapted to supply energy to the system. Coaxial with the conductor 108 there is provided a metal sleeve 109 which is slidably mounted so that its extremity may be caused to extend into the space between the disks 106 and 107, the position of the sleeve being determinable by means of a rack and pinion arrangement indicated at 111. A slot 110 provided near the extremities of the sleeve permits it to be moved all the way to the left without interfering with the coupling loop 112. The effect of moving the sleeve into or out of the inter-disk space is equivalent to varying the effective radius of the hub of the resonant structure and, therefore, provides an excellent means for producing precise tuning of the structure. (From the theoretical analysis hereinbefore given it will be understood that the frequency of resonance of a structure of the kind illustrated is a direct function of the hub radius.)

In the arrangements just described the capacitance between the electrodes of the various tubes employed and the inductance of the tube lead-in connections necessarily represent discontinuities in the resonant system provided by the disk elements. This difficulty may be substantially overcome by the use of special tube structures of the character illustrated in Figs. 13 and 14.

Figures 13, 14, 14A:
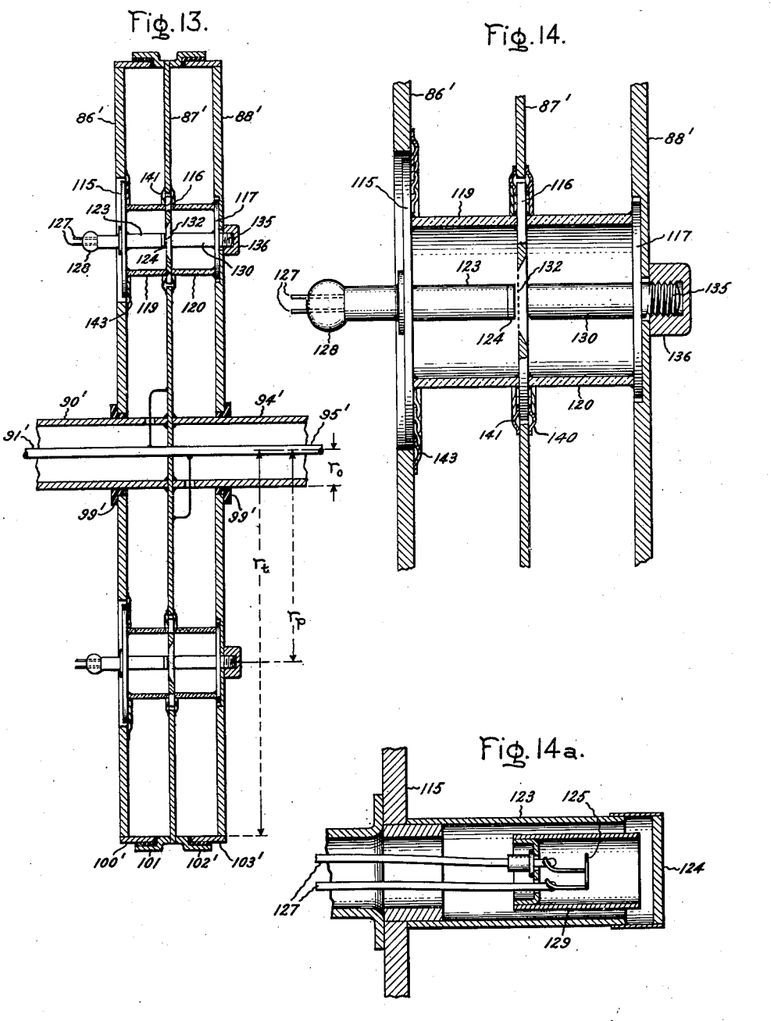
Fig. 13 shows the use of the invention in connection with a special form of electronic discharge device.
Fig. 14 is an enlarged detailed view of one aspect of Fig. 13.
Fig. 14a is a still further enlarged section of a part of Fig. 14.

The first of the figures referred to represents an arrangement which is substantially the same, as far as the disk structure is concerned, as that of Fig. 11 and for this reason elements which perform similar functions are similarly identified except for the expedient of priming the reference numerals. In this case, however, each of the tubes employed is constituted of a series of three disk-like members, numbered 115 to 117, inclusive, which are insulatingly separated by means of glass cylinders 119 and 120. These cylinders are hermetically joined at their extremities to the disk parts 115—117, which may consist, for example, of an alloy of nickel, iron and cobalt plated with copper to facilitate sealing to glass. As is shown more clearly in Fig.

14, the disk 115 is provided centrally with a protuberant hollow cylinder 123 having its extremity closed by a metal cap 124 which is coated on its outer surface with an electron emissive material. The disk 124 is maintained at a temperature of effective electron emission by means of a resistance heater 125 which is enclosed within the confines of the cylinder 123 (see Fig. 14a) and which is supplied with heating current by means of lead-in conductors 127 sealed into an outwardly projecting extension of the cylinder 123 as indicated at 128. A metal heat shield 129 provided in connection with the filamentary heater 125 serves to focus radiations from the heater upon the inner surface of the cap 124.

At the other end of the tube and projecting from the central area of the disk 117 there is provided a solid metal cylinder 130 which extends to within a short distance of the emitting disk 124 and which is adapted to serve as an anode element. The anode and cathode are separated by means of a grid 132, suitably of tungsten, which extends across a central aperture formed in the disk 116.

The disks 115, 116 and 117 are so related that their spacing corresponds to the spacing of the resonator disks 86', 87' and 88' and in the arrangement illustrated they form substantially continuous extensions of the surfaces of these disks. In order to permit the ready assembly of the tubes in the resonator system the disks 115 to 117 are of varying sizes as indicated and respectively correspond in diameter to openings provided in the surfaces of the various resonator disks. The disk 117 is provided on its outer surface with a screw-threaded stud 135 which fits into a cooperatingly recessed block fixed to the resonator disk 88'. In initially positioning the tube in the resonator system the disk 117 is passed through openings provided in the resonator parts 86' and 87', these openings being of sufficient size to permit such action. When the screw-threaded terminal 135 engages the recessed block 136, the outer edge of the disk 117 simultaneously engages a resilient dentate annulus 140 which is secured to one surface of the disk 87'. The disk 116 is itself provided with a circular spring annulus 141 which is rigidly secured thereto and which engages a face of the resonator disk 87' when the parts are in the assembly shown in Fig. 14. Finally, the disk 115, which is of greatest diameter, engages a resilient annulus 143 which is secured to the resonator disk 86'. The central opening of the spring 143 is of sufficient size to permit all parts of the tube except the disk 115 to pass through the same.

With the arrangement described above it will be seen that the only lead-in connections to the various electrodes of each tube are the disks 115 to 117 which constitute continuous extensions of the various resonator disks. As a result all lead inductance to the grid 132 is absorbed as a useful and necessary part of the resonant circuit itself and all inductance in the cathode and anode circuits is similarly absorbed except that due to the cathode cylinder 123 and to the anode rod. Moreover, all the interelectrode capacitance is incorporated into the oscillating circuit except the relatively insignificant capacitance existing between the extremity cathode of the cylinder and the grid and between the grid and the end of the anode 130. The anode and grid electrodes are effectively cooled by heat conduction through the disks 115 to 117 to the resonator plates, these being in turn well adapted for forced air cooling. Consequently, the capacity of the system is considerably increased over that which could be realized by the use of conventional tubes.

The discharge tube construction shown in Fig. 14 is more specifically described and claimed in my copending application Serial No. 408,364, filed August 26, 1941, while certain features of the resonant structure of Fig. 1 are claimed in my application Serial No. 408,363, also filed August 26, 1941.

Figure 15:
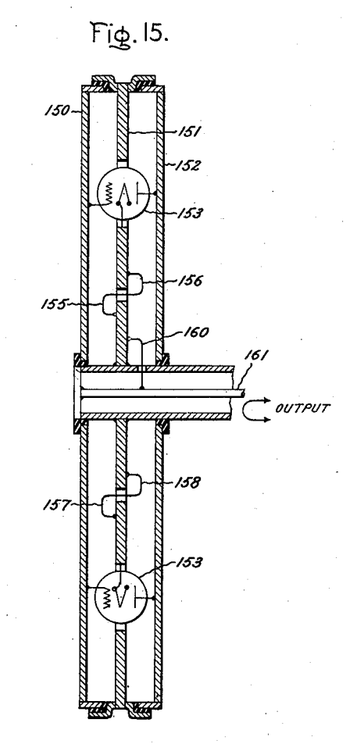
Fig. 15 illustrates the application of the invention in connection with an oscillator.

While the invention has so far been described mainly in connection with amplifier circuits, it may be used alternatively in connection with an oscillator and an arrangement for permitting such use is illustrated in Fig. 15. In this figure there is provided a resonant system comprising the combination of three disks 150, 151 and 152 in combination with a series of electron tubes 153 having their electrodes respectively connected to the various disks. (The direct current connections for the tubes are not shown.) Coupling is provided between the space bounded by the disks 150 and 151 and that bounded by the disks 151 and 152 by means of a pair of interconnected coupling loops 155 and 156, and for purposes of symmetry another pair of loops 157 and 158 is provided at another point in the enclosed space. With this arrangement a portion of the wave energy developed in the space between the disks 151 and 152 is fed back to the space between the disks 150 and 151 and thus serves to maintain the latter space in excited condition. By this means and through the operation of the tubes 153 the system as a whole may be maintained in self-sustained oscillation at a frequency corresponding to the resonant frequency of the disk structure. Energy may be taken from the space between the disks 151 and 152 for utilization outside the resonant structure by means of a separate coupling loop 160 which is terminally connected to the inner conductor 161 of a coaxial transmission line. The transmission line may be terminally connected to an appropriate utilization device such as an antenna (not shown).

Figure 16:
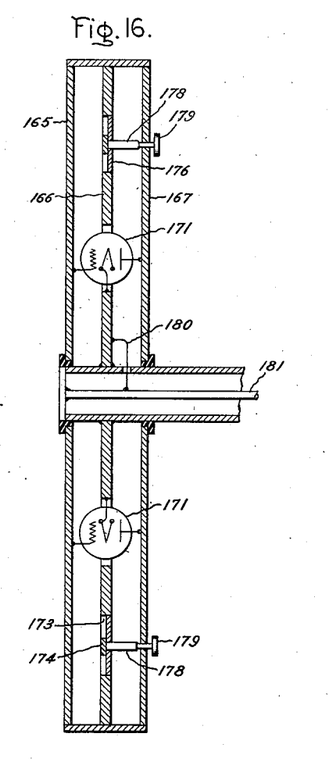
Fig. 16 is a structural modification of the arrangement of Fig. 15.
Figure 17:
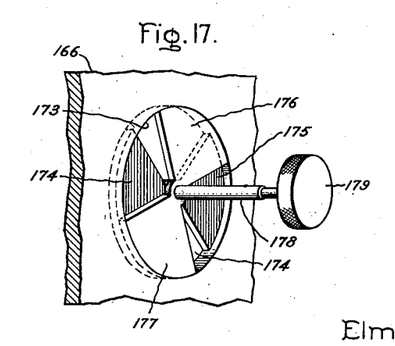
Fig. 17 is an enlarged detailed view of one feature of Fig. 16.

In some cases it is desirable that means be provided for conveniently adjusting the amount of coupling between the grid and plate circuits of an oscillator of the character illustrated in Fig. 15. This may be done in one way by an arrangement such as is shown in Figs. 16 and 17, wherein there is illustrated a resonant structure comprising the combination of disks 165 to 167 and a plurality of appropriately connected electron tubes 171. The central disk 166 is provided at one region thereof with a circular opening 173 which is partially closed by a pair of wedge-shaped vanes 174 and 175 supported fixedly in the opening (see Fig. 17). The size of the unclosed remainder of the opening is regulable by means of a pair of vanes 176 and 177 which may be moved rotationally through a shaft 178 terminating in an externally accessible knob 179. The vanes 176 and 177 are of such size as completely to close the opening in at least one of their rotational positions. In other positions, such as the position illustrated in Fig. 17, they leave a portion of the opening unobscured.

The passage provided through the disk 166 by the unobscured areas of the opening 173 permits transfer of energy between the two resonant cavities on opposite sides of the disk, and by virtue of the feed-back effects thus resulting tend to maintain the resonant system as a whole in self-sustained oscillation. The conditions of oscillation may be regulated as above suggested by varying the position of the vanes 176 and 177 so as to adjust in a desired manner the amount of feed back. As in the arrangements previously described energy may be taken from the system by means of a separate coupling loop 180 which connects with the inner conductor 181 of a coaxial transmission line leading from the structure.

In addition to the uses described in the foregoing, the resonant structures which constitute my invention may be applied in numerous other ways, as for introducing various types of waves into wave guides, for coupling energy out of wave guides, and for matching coaxial transmission lines of different impedance characteristics. I aim in the appended claims to cover all such equivalent applications as come within the true spirit and scope of the foregoing disclosure.

What I claim as new and desire to secure by Letters Patent of the United States is:

1. In combination, a resonant structure for use at a particular frequency comprising a pair of generally similar disk-like members positioned in face-to-face relation, a conductive hub extending between the members at a region surrounding their line of centers, the members being sufficiently close so that the inductive reactance of the hub is negligible in comparison with the lumped capacitive reactance of the members and the radius of the hub being correlated to the common radius of the members to compel the occurrence between the members of radially propagated standing waves when the structure is excited at the said particular frequency; and an electronic discharge device having electrodes thereof respectively connected to said members at a region chosen to assure the effective interchange of energy between the resonant structure and the device as an incident of the occurrence of said radially propagated waves, the radial distance $r_p$ between the said region of connection of the electrodes and the line of centers of the disk-like members being related to the radius $r_0$ of the hub by the equality $$\frac{J_0(2\pi r_0/\lambda)}{N_0(2\pi r_0/\lambda)} = \frac{J_1(2\pi r_p/\lambda)}{N_1(2\pi r_p/\lambda)}$$

where $J_0$ and $J_1$ represent Bessel functions of the first kind and respectively of the zero and first orders, $N_0$ and $N_1$ represent Bessel functions of the second kind and respectively of the zero and first orders, and $\lambda$ represents an operating wave-length corresponding to the said particular frequency.

2. A resonant system for use at a particular frequency comprising a pair of similar disk-like members positioned in face-to-face relation, a conductive hub extending between the members at a region surrounding their line of centers, the members being sufficiently close so that the inductive reactance of the hub is negligible in comparison with the lumped capacitive reactance of the members and the radius of the hub being correlated to the common radius of the members to compel the occurrence between the members of radially propagated standing waves when the system is excited at the said particular frequency, a coaxial conductor transmission line utilizing the said hub as the outer conductor thereof, and means including said transmission line for accomplishing transfer of wave energy between the space enclosed by the said members and an external agency.

3. A resonant system for use at a particular frequency comprising three coaxially arranged disk-like members positioned in mutually spaced relation, a conductive hub structure extending between the members in a region surrounding their line of centers, the members being sufficiently close to one another so that the inductive reactance of the hub structure is negligible in comparison with the lumped capacitive reactance of the members and the radius of the hub being correlated to the common radius of the members to compel the occurrence between the members of axially propagated standing waves when the structure is excited at the said particular frequency, means including a first coaxial transmission line having a portion of said hub structure as the outer conductor thereof for supplying wave energy to the space between one pair of adjacent members, and means including a second coaxial conductor transmission line having another portion of said hub structure as the outer conductor thereof for transferring energy from the space between the second pair of adjacent members to an external agency.

4. In combination, a resonant system for use at a particular frequency comprising a pair of similar disk-like conductive members positioned in face-to-face relation, circumferentially extending conductive means effectively short circuiting the members with respect to high frequency currents at the outer periphery of the space bounded by the members, and a conductive hub extending between the said members in a region surrounding their line of centers, the members being sufficiently close to one another so that the inductive reactance of the hub structure is negligible in comparison with the lumped capacitive reactance of the members and the radius of the hub being correlated to the common radius of the members to compel the occurrence of radially propagated standing waves between the members when the system is excited at the said particular frequency, and an electronic discharge device having electrodes thereof respectively connected to the said members at a region sufficiently displaced from the line of centers of the members to assure the effective interchange of energy between the resonant system and the device as an incident of the occurrence of said radially propagated waves.

5. A resonant system for use at a particular frequency comprising a pair of similar disk-like conductive members positioned in face-to-face relation, conductive means extending between the members at their peripheries for preventing radiation from the space bounded by the members, a conductive hub extending between the members in a region surrounding their line of centers, the members being sufficiently close to one another so that the inductive reactance of the hub structure is negligible in comparison with the lumped capacitive reactance of the members, and an electronic discharge device having electrodes thereof respectively connected to the said members for energy-exchange therewith at a radial distance $r_p$ from the line of centers of the members; the radial distance $r_p$ being related to the radius $r_0$ of the hub and to the common radius $r_t$ of the members by the following equality:

$$\frac{J_0(2\pi r_0/\lambda)}{N_0(2\pi r_0/\lambda)} = \frac{J_1(2\pi r_p/\lambda)}{N_1(2\pi r_p/\gamma)} = \frac{J_0(2\pi r_t/\lambda)}{N_0(2\pi r_t/\lambda)}$$

where $J_0$ and $J_1$ represent Bessel functions of the first kind and respectively of the zero and first orders, $N_0$ and $N_1$ represent Bessel functions of the second kind and respectively of the zero and first orders, and $\lambda$ represents an operating wavelength corresponding to the said particular frequency.

6. A resonant system comprising a pair of similar conductive disk-like members positioned in face-to-face relation, a conductive hub extending between said members and coaxial with their line of centers, the members being sufficiently close to one another so that the inductive reactance of the hub is negligible in comparison with the lumped capacitive reactance of the members and the radius of the hub being correlated to the common radius of the members to assure the occurrence between the members of radially propagated standing waves when the structure is excited at a particular frequency, and means for varying the effective radius of the hub to permit adjustment of the resonant frequency of the system.

7. A resonant system comprising a pair of similar conductive disk-like members positioned in face-to-face relation, a conductive hub extending between said members and coaxial with their line of centers, the members being sufficiently close to one another so that the inductive reactance of the hub is negligible in comparison with the lumped capacitive reactance of the members and the radius of the hub being correlated to the common radius of the members to assure the occurrence between the members of axially propagated standing waves when the structure is excited at a particular frequency, a conductive sleeve slidable on said hub and having one extremity thereof extending into the space between the members, and externally accessible means for varying the position of the sleeve on the hub so as to regulate the resonant frequency of the system.

8. In combination, a resonant system for use at a particular frequency comprising three coaxial disk-like members arranged in mutually spaced relation, a hub structure extending between the members and coaxial with their line of centers, the members being sufficiently close to one another so that the inductive reactance of the hub structure is negligible in comparison with the lumped capacitive reactance of the members and the radius of said hub structure being correlated to the common radius of the members to compel the occurrence between the members of radially propagated standing waves when the system is excited at the said particular frequency, an electronic discharge device having electrodes thereof respectivly connected to the various members at a region radially displaced from the said hub structure and corresponding to an antinodal point of the waves propagated between the members, means for impressing direct current potentials between the various electrodes to facilitate operation of the electronic device as an oscillator, and means for providing interchange of wave energy between the spaces enclosed by the members, thereby to produce sustained oscillation of the system.

9. In combination, a resonant system for use at a particular frequency comprising three coaxial disk-like members arranged in mutually spaced relation, a hub structure extending between the members and coaxial with their line of centers, the radius of said hub structure being correlated to the common radius of the members to compel the occurrence between the members of radially propagated standing waves when the system is excited at the said particular frequency, an electronic discharge device having electrodes thereof respectively connected to the variaous members at a region corresponding to an antinodal point of the waves propagated between the members, means for impressing direct current potentials between the various electrodes to facilitate operation of the electronic device as an oscillator, an opening in the central disk-like member to permit interchange of wave energy between the spaces enclosed by the members, thereby to produce sustained oscillation of the system, and externally accessible means for varying the dimensions of the said opening so as to regulate the said interchange of energy.

ELMER D. McARTHUR.

Certificate of Correction

Patent No. 2,284,405.   May 26, 1942.

ELMER D. McARTHUR

It is hereby certified that errors appear in the printed specification of the above numbered patent requiring correction as follows: Page 2, second column, line 7, Equation 10, for "$" both occurrences, read $s$; line 30, Equation 13, for "$" read $s$; line 58, for "betwen" read *between*; page 4, first column, line 13, for "disburbances" read *disturbances*; page 5, second column, line 6, for "The" read *Their*; page 6, first column, line 73, for "cathode of the" read *of the cathode*; page 7, second column, line 75, claim 5, in the equation, for "$N_1(2\pi r_p/\gamma)$" read $N_1(2\pi r_p/\lambda)$; page 8, second column line 11, for "respectivly" read *respectively*; line 34, for "variaous" read *various*; and that the said Letters Patent should be read with these corrections therein that the same may conform to the record of the case in the Patent Office.

Signed and sealed this 21st day of July, A. D. 1942.

[SEAL]

HENRY VAN ARSDALE,
*Acting Commissioner of Patents.*